United States Patent
Wilkins et al.

(10) Patent No.: US 6,862,660 B1
(45) Date of Patent: *Mar. 1, 2005

(54) TAG MEMORY DISK CACHE ARCHITECTURE

(75) Inventors: Virgil V. Wilkins, Perris, CA (US); Ralph H. Castro, Lake Forest, CA (US); Tsun Y. Ng, Orange, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/419,459

(22) Filed: Apr. 21, 2003

Related U.S. Application Data

(63) Continuation of application No. 09/552,404, filed on Apr. 19, 2000, now Pat. No. 6,553,457.

(51) Int. Cl.[7] .............................................. G08F 12/00
(52) U.S. Cl. ...................... 711/113; 711/114; 711/118; 711/202
(58) Field of Search .................................. 711/113, 119, 711/126, 123, 114, 118; 710/202, 22

(56) References Cited

U.S. PATENT DOCUMENTS

| | | | | |
|---|---|---|---|---|
| 5,875,352 A | * | 2/1999 | Gentry et al. | 710/23 |
| 6,018,789 A | * | 1/2000 | Sokolov et al. | 711/113 |
| 6,553,457 B1 | * | 4/2003 | Wilkins et al. | 711/113 |

* cited by examiner

*Primary Examiner*—Donald Sparks
*Assistant Examiner*—Brian R. Peugh
(74) *Attorney, Agent, or Firm*—Milad G. Shara, Esq.; Robroy R. Fawcett, Esq.

(57) ABSTRACT

The present invention is embodied in the disk drive having a cache control system that is configured to efficiently respond to host commands by forming variable length segments of memory clusters for caching disk data in contiguous ranges of logical block addresses without regard to the sequential order of the memory clusters. The cache control system has a tag memory usable only for defining the segments. The tag memory has a plurality of tag records pointing to cluster control blocks associated with the memory clusters for defining the segments. The tag memory may be accessed and updated by several state machines in the cache control system and by a microprocessor in the disk drive.

14 Claims, 2 Drawing Sheets

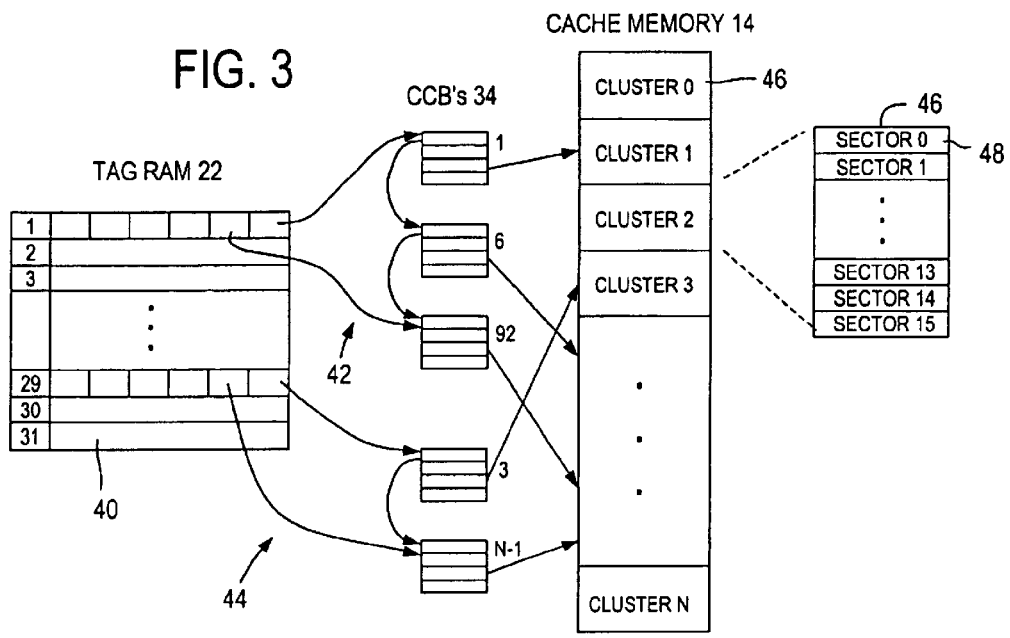
FIG. 3
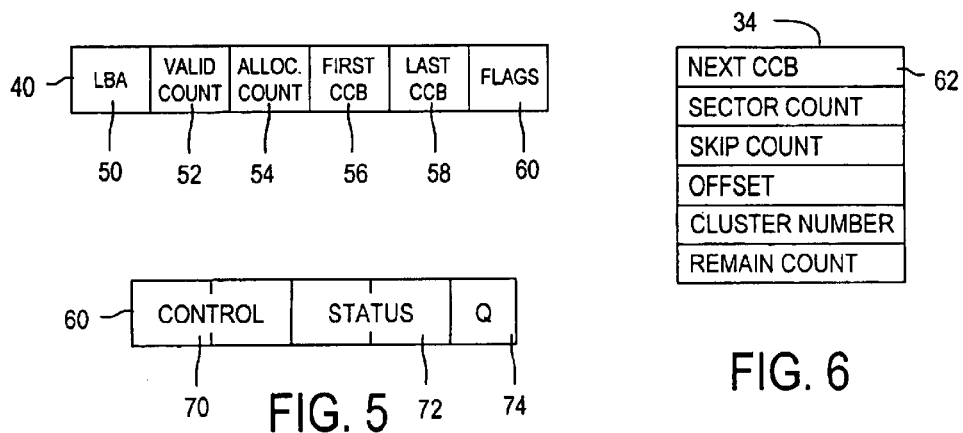
FIG. 4
FIG. 5
FIG. 6

TAG MEMORY DISK CACHE ARCHITECTURE

This is a continuation of application Ser. No. 09/552,404, filed Apr. 19, 2000, U.S. Pat. No. 6,553,457, hereby incorporated by reference.

BACKGROUND OF THE INVENTION

1. Field of the Invention

The present invention relates to disk drive performance features and more particularly to a disk drive having a cache control system for improving the disk drive's response time to host commands.

2. Description of the Prior Art

A host computer stores and accesses data on a disk drive by issuing commands to the disk drive over a standardized interface. The smallest indivisible data unit addressable on a disk is a logical block or disk sector, typically of 512 bytes, and each such disk sector is assigned a logical block address (LBA). When the host computer sends a command to the disk drive, the nature of the command is specified, e.g., read or write, along with a start LBA and a count specifying the number of contiguous sectors to be transferred.

Existing disk drives typically have a semiconductor cache memory for temporarily storing disk data that is likely to be requested by a host computer. The response time latency for storing and accessing data in a semiconductor memory is much smaller than the response time latency for mechanically storing and accessing data stored on a rotating disk. In existing disk drives, if the entire LBA range specified by a host command cannot be stored in a contiguous segment in the cache memory, then a sufficiently large contiguous segment in the cache memory must be allocated and configured for responding to the host command. The disk drive's response to the host command may be delayed while the contiguous segment is formed.

Accordingly, there exists a need for a disk drive having a disk cache architecture for efficiently configuring memory segments for effectively responding to host commands. The present invention satisfies these needs.

SUMMARY OF THE INVENTION

The present invention is embodied in a disk drive having a cache control system that is configured to effectively and efficiently respond to host commands by forming variable length segments of memory clusters for caching disk data in contiguous ranges of logical block addresses without regard to the sequential order of the memory clusters. The cache control system has a tag memory usable only for defining the segments.

An embodiment of the invention may reside in a disk drive having a cache memory and the cache control system. The cache memory has a plurality of sequentially-ordered memory clusters for caching disk data of disk sectors identified by logical block addresses. The cache control system has a tag memory only usable and configured to define variable length segments of memory clusters. Each segment is for caching disk data of a contiguous range of logical block addresses using the memory clusters without regard to the sequential order of the memory clusters.

The disk drive may further include a plurality of cluster control blocks with each cluster control block being associated with a particular cluster of the cache memory. The tag memory may define each segment using the cluster control blocks. Each cluster control block that is associated with a segment is configured to point to a subsequent cluster control block or to indicate an end cluster control block of the segment. The tag memory may include a tag record associated with each segment for pointing to a first cluster control block associated with a first logical block address, and to a last cluster control block associated with a last logical block address of the associated segment or to an allocated count associated with a length of the associated segment. The tag record may also indicate a cache state of the disk data in a segment.

The disk drive also may include a scan engine, a microprocessor, or a host writable control store for accessing the tag records in the tag memory, and may further include means for arbitrating access to the tag records between the scan engine, the microprocessor, and the host writable control store.

BRIEF DESCRIPTION OF THE DRAWINGS

The accompanying drawings illustrate embodiments of the present invention and, together with the description, serve to explain the principles of the invention.

FIG. 3 is a block diagram showing a table of tag records in the tag memory of the cache control system of FIG. 1, for defining segments of memory clusters using cluster control blocks.

FIG. 4 is a data structure for a tag record in the table of tag memory records of FIG. 3.

FIG. 5 is a data structure for a status and control flag in the tag record data structure of FIG. 4.

FIG. 6 is a data structure for a cluster control block for use by the tag records of FIG. 3.

DETAILED DESCRIPTION

Figure 1:
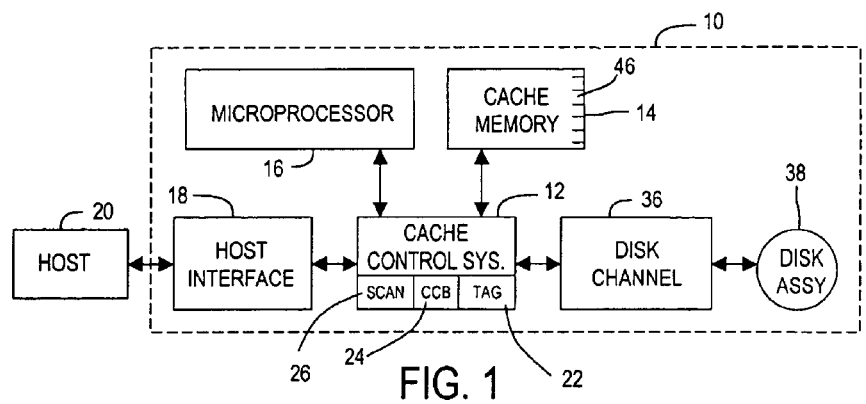
FIG. 1 is a block diagram of a disk drive having a cache control system with a tag memory only usable and configured to define variable length segments of cache memory clusters for efficiently responding to host commands, according to the present invention.

With reference to FIG. 1, a disk drive 10 comprises a cache memory 14 having a plurality of sequentially-ordered memory clusters 46 for caching disk data stored in sectors (not shown) on disks of a disk assembly 38. Conventionally the disk sectors are identified by logical block addresses (LBAs). A cache control system 12 comprises a tag memory 22 which is embedded within the cache control system 12 and thereby configured only for use in defining variable length segments of the memory clusters 46. Each defined segment of memory clusters 46 is for caching data from a contiguous range of the logical block addresses. The cache control system efficiently exploits available clusters 46 without regard to their sequential order.

The disclosures of the following three U.S. Patent Applications are hereby incorporated herein by reference: application Ser. No. 09/552,399, filed on Apr. 19, 2000, titled RANGE-BASED CACHE CONTROL SYSTEM AND METHOD; application Ser. No. 09/552,407, filed on Apr. 19, 2000, titled CLUSTER-BASED CACHE MEMORY ALLOCATION; and application Ser. No. 09/552,402, filed on Apr. 19, 2000, titled CACHE CONTROL SYSTEM AND METHOD HAVING HARDWARE-BASED TAG RECORD ALLOCATION.

With reference again to FIG. 1, the disk drive 10 further includes a microprocessor 16, and a host interface 18. The host interface 18 receives host commands from a host 20, such as a personal computer, and transfers disk data between the disk drive 10 and the host 20. The host commands identify the disk data using a start logical block address (LBA) and a count specifying the number of contiguous sectors to be transferred. The cache memory 14 caches the disk data under the direction of the cache control system 12 and the microprocessor 16. The microprocessor 16 operates under firmware control and manages the operation of the disk drive 10 and assists hardware elements under specific conditions. The cache memory 14 is random access memory, typically 2 megabytes (MB). Generally, the larger the cache memory 14, the better the performance of the disk drive 10 in responding to host commands. The cache control system 12 includes the aforementioned tag (random access) memory (RAM) 22 and a cluster control block (CCB) memory 24 described below.

The disk drive 10 also includes a disk channel 36 and the aforementioned disk assembly 38. The disk assembly 38 includes a disk platter that is organized into the disk sectors, typically of 512 bytes plus redundancy bytes for error correction, which are individually addressable using a logical block address (LBA). The disk channel 36 performs conventional encoding and decoding of data written to and read from the disk.

Figure 2:
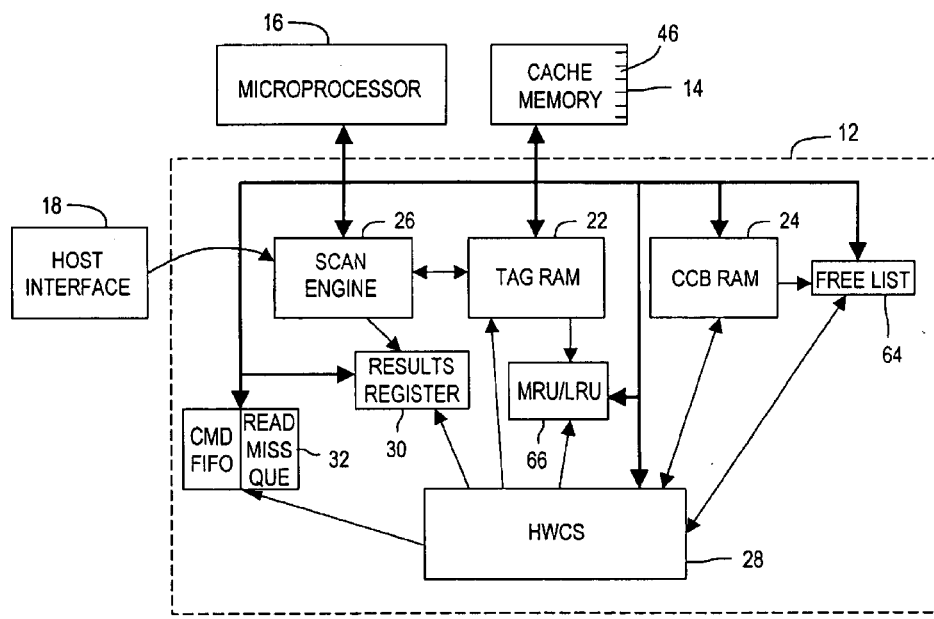
FIG. 2 is a block diagram showing the cache control system of FIG. 1 with a tag memory, according to the present invention.

The cache control system 12 is shown in more detail in FIG. 2. The cache control system 12 includes the tag memory 22 and the CCB memory 24. The tag memory 22 is a static random access memory (SRAM) structure which is preferably embedded in an integrated controller chip having a table of tag or segment records. The embedded tag memory 22 thus provides higher performance and lower cost versus firmware based cache control schemes which use a general purpose external RAM. In particular since internal hardware engines, as described further below, may access the tag records in parallel with and independently from microprocessor 16, the cache control system 12 enables higher performance by off-loading microprocessor 16 and providing hardware based processing as detailed below. The CCB memory 24 is also preferably an embedded SRAM having a plurality of records or CCBs (cluster control blocks) 34.

The tag memory 22 may be accessed by the microprocessor 16, a scan engine 26 and a host writable control store (HWCS) 28, and may be updated by the microprocessor 16 and the HWCS 28. The scan engine 26 is coupled to the host interface 18 and receives host commands and scans the tag memory 22 for the LBA ranges associated with a host command. The scan engine 26 places the scan results in a results register 30 or, if servicing the host command further requires intervention by the microprocessor, the HWCS 28 places the command in a command queue 32. The command queue 32 has a read miss queue and a write command first-in first-out (FIFO) queue. The scan engine 26 is described in more detail in the above-referenced U.S. application Ser. No. 09/552,399, titled RANGE-BASED CACHE CONTROL SYSTEM AND METHOD. If a host command may be responded to by the cached data referenced in the tag memory 22, then the HWCS 28 manages the response to the host command, otherwise the microprocessor 16 may assist with the response. Thus, the HWCS 28 off-loads cache tasks from the microprocessor 16 enabling response to host commands for data already in the cache memory 14 without microprocessor intervention.

The tag memory 22 is described in more detail with reference to FIGS. 3 and 4. The tag memory 22 has a plurality of tag records 40 that define segments, 42 and 44, of memory clusters 46 within the cache memory 14.

Typically, the tag memory 22 may have 32 or 64 records dedicated to defining variable length segments. Other tag memory records (not shown) may be dedicated to single block transfers for caching small data elements stored within one memory cluster 46 that are repeatedly accessed by the host 20. The cache memory 14 is divided into 512 byte blocks or sectors 48. Each cache sector 48 is for storing disk data of a 512-byte disk sector. Note that if the number of bytes in a disk sector is defined to have, for example, 1024 bytes the number of bytes in a cache sector 48 is similarly defined to have 1024 bytes. The cache sectors 48 are bunched into consecutively numbered groups or clusters. Each cluster 46 has a particular cluster number. Preferably, each cluster 46 has 16 cache sectors 48, although the number of sectors 48 in each cluster 46 may be selected based on the size of the cache memory 14, the size of the CCB SRAM 24, and the operational characteristics of the host 20.

The tag memory 22 defines the segments of the cache memory clusters 46 using the CCBs 34. The number of CCBs 34 is equal with the number of clusters 46 with each CCB 34 having the same identification number as the corresponding cluster 46. Each tag record 40 has entries or fields (50, 52, 54, 56, 58 and 60) for indicating the first disk LBA assigned to the corresponding segment, the number of valid sectors in the segment, the number of sectors allocated to the segment, the first segment CCB, the last segment CCB, and state and control flags for the segment. As shown in FIG. 6, each CCB has a pointer 62 to a next CCB in a segment or to indicate that the CCB is the last CCB in the segment. Accordingly, a tag record 40 defines a segment by recording the segment's first CCB in the first CCB entry 56. The first CCB 34 has a pointer 62 to the next or second CCB in the segment. The second CCB likewise has a pointer 62 to the next CCB until the last CCB in the segment. The last CCB has an indicator such as a null value that indicates the end of the segment. The null value may be selected to be zero in which case the CCB and cluster number 0 is not used. Alternatively, the allocated count entry 54 may be used in indicating the end of the segment by counting the number of CCBs in the segment.

A segment that is assigned to a tag record 40 may have any length up to the total number of available CCBs 34. It is possible (although unlikely) that the entire cache memory 14 may be assigned to one segment.

Two short exemplary segments, 42 and 44, are shown in FIG. 3. The first segment 42 is formed by three clusters 46. The first tag record 40 has a first segment CCB entry 56 pointing to the CCB number 1, which CCB is associated with the cluster number 1. The CCB number 1 points to the CCB number 6, which CCB is associated with cluster number 6. The CCB number 6 points to the CCB number 92, which CCB is associated with the cluster number 92. The CCB number 92 has a null value in its next cluster pointer indicating the end of the segment 42. The first tag record 40 also has an entry 58 pointing to the last segment CCB, which in this case is CCB number 92.

The second segment 44 is defined by the tag record number 29 to have a length of two clusters 46. The first cluster 46 of the segment 44 is the cluster number 3 and the second and last cluster of the segment 44 is the cluster number N−1. Accordingly, the tag record number 29 has a first segment CCB entry 56 pointing to CCB number 3 and a last segment CCB entry 58 pointing to CCB number N−1. The cluster number 3 points to the cluster number N−1, and the cluster number N−1 has a null value in its pointer.

The length of a segment may be extended by changing the last CCB 34 of the segment to point to a next added CCB, and by updating the allocated count entry 54 and the last segment CCB entry 58 in the tag record 40. The tag record pointer entries, 56 and 58, in conjunction with the CCB pointers 62, allow definition of variable length segments without regard to the logical or numerical order of the clusters 46 in the cache memory 14. Accordingly, the tag memory 22 provides a flexible and powerful disk cache technique for efficiently responding to host commands.

The cache control system 12 (FIG. 2) also includes a free list 64 and a most-recently-used/least-recently-used (MRU/LRU) engine 66. The free list 64 tracks any CCBs 34 not assigned to a tag record 40. Accordingly, all CCBs 34 are assigned to either a tag record 40 or to the free list 64. The CCBs 34 and the free list 64 is described in more detail in the above-referenced U.S. application Ser. No. 09/552,407, titled CLUSTER-BASED CACHE MEMORY ALLOCATION. The MRU/LRU engine 66 keeps track of the currency of the cached data associated with each tag record 40 in the tag memory and is described in more detail in above-referenced U.S. application Ser. No. 09/552,402, titled CACHE CONTROL SYSTEM AND METHOD HAVING HARDWARE-BASED TAG RECORD ALLOCATION.

The preferred data structure of the entries (FIG. 4) in the tag records 40 is now described. The first entry 50 in a tag record 40 is a 32-bit address representing the first logical block address of the segment being defined by the tag record 40. The next entry 52 in the tag record 40 is a 10 bit valid count representing the number of valid sectors in the segment. When a data read ahead is performed, the valid count represents the valid data sectors put into the cache memory 14. When data sectors are being written, the HWCS 28 will update the valid count as data is written to cache memory 14. The next entry 54 in the tag record is a 10-bit allocated count representing the number of cache sectors 48 allocated to the segment. The allocated count is generally equal to the valid count at command completion when a command is prematurely aborted. In any event, the valid count is never greater than the allocated count. The next entry 56 in the tag record 40 is an 8-bit first segment CCB pointer to the first CCB 34 used in the segment. The next entry 58 in the tag record 40 is an 8-bit last segment CCB pointer. The next entry 60 in the tag record 40 is a series of status and control flags for use by the scan engine 26, the microprocessor 16 and the HWCS 28. Among other things, the status and control flags are used for managing tag record allocations and transfers of data between the memory clusters 46 and the host 20, and between the memory clusters 46 and the disk 38.

As shown in FIG. 5, the status and control flag entry 60 includes a 2-bit control flag 70, a 2-bit status flag 72, and a 1-bit Q scan flag 74. The control flag 70 indicates ownership of the tag record 40. Ownership of a tag record may be maintained by the microprocessor 20, the HWCS 28, or the scan engine 26. The status flag 72 indicates the status of the disk data stored in the memory clusters 14 associated with the tag record 40. The status may be free, available, valid, or valid/dirty. The free status indicates that no valid data is associated with the tag record 40. The available status indicates that valid data is associated with the tag record 40, but that the data may be discarded and the tag record 40 reused. The valid status indicates that valid data is stored in the memory clusters 46 of the segment defined by the tag record. The valid/dirty status indicates a segment of memory clusters 46 having valid data that has not been written to the disk 38. All host write data is marked as valid/dirty when it is transferred into the cache memory by the HWCS 28. The Q scan flag 74 is used during a review of the tag records 40 by the MRU/LRU engine 66.

We claim:

1. A disk drive, comprising:

a cache memory having a plurality of sequentially-ordered memory clusters for caching disk data of disk sectors identified by logical block addresses; and a cache control system having a tag memory only usable and configured to define variable length segments of the memory clusters, each segment for caching disk data of a contiguous range of the logical block addresses using the memory clusters without regard to the sequential order of the memory clusters.

2. A disk drive as defined in claim 1, further comprising a plurality of cluster control blocks, each cluster control block being associated with a particular cluster of the cache memory.

3. A disk drive as defined in claim 1, wherein the tag memory includes a tag record indicating a cache state of the disk data in a segment.

4. A disk drive as defined in claim 1, wherein the memory clusters are uniformly sized.

5. A disk drive as defined in claim 1, wherein the tag memory includes a plurality of tag records that may be accessed by a scan engine, a microprocessor, or a host writable control store.

6. A disk drive as defined in claim 5, further comprising means for arbitrating access to the tag records between the scan engine, the microprocessor, and the host writable control store.

7. A disk drive as defined in claim 1, wherein the cache memory is separate from the tag memory of the cache control system.

8. A cache control system for caching disk data of disk sectors identified by logical block addresses using a cache memory having a plurality of sequentially ordered memory clusters, comprising a tag memory configured to define variable length segments of memory clusters, each segment for caching disk data of a contiguous range of logical block addresses using the memory clusters without regard to the sequential order of the memory clusters.

9. A cache control system as defined in claim 8, further comprising a plurality of cluster control blocks, each cluster control block being associated with a particular cluster of the cache memory.

10. A cache control system as defined in claim 8, wherein the tag memory includes a tag record indicating a cache state of the disk data in a segment.

11. A cache control system as defined in claim 8, wherein the memory clusters are uniformly sized.

12. A cache control system as defined in claim 8, wherein the tag memory includes a plurality of tag records that may be accessed by a scan engine, a microprocessor, or a host writable control store.

13. A cache control system as defined in claim 12, further comprising means for arbitrating access to the tag records between the scan engine, the microprocessor, and the host writable control store.

14. A cache control system as defined in claim 8, wherein the tag memory is separate from the cache memory.

* * * * *